(12) United States Patent
Behzad et al.

(10) Patent No.: US 9,047,127 B2
(45) Date of Patent: *Jun. 2, 2015

(54) METHOD AND SYSTEM FOR AN ATOMIZING FUNCTION OF A MOBILE DEVICE

(71) Applicant: Broadcom Corporation, Irvine, CA (US)

(72) Inventors: Arya Behzad, Poway, CA (US); Mark Buer, Gilbert, AZ (US); Jeyhan Karaoguz, Irvine, CA (US); Alexander MacInnis, Ann Arbor, MI (US); Thomas Quigley, Franklin, NC (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,368

(22) Filed: Apr. 30, 2013

(65) Prior Publication Data

US 2013/0239118 A1 Sep. 12, 2013

Related U.S. Application Data

(63) Continuation of application No. 11/864,562, filed on Sep. 28, 2007, now Pat. No. 8,442,015.

(60) Provisional application No. 60/951,014, filed on Jul. 20, 2007.

(51) Int. Cl.
*H04W 4/00* (2009.01)
*G06F 9/50* (2006.01)
*H04L 29/08* (2006.01)

(52) U.S. Cl.
CPC ............... *G06F 9/5044* (2013.01); *H04L 67/16* (2013.01); *H04L 67/10* (2013.01)

(58) Field of Classification Search
None
See application file for complete search history.

(56) References Cited

U.S. PATENT DOCUMENTS

| 8,442,015 | B2 | 5/2013 | Behzad et al. |
| 2004/0210657 | A1 | 10/2004 | Narayanan et al. |
| 2006/0031509 | A1* | 2/2006 | Ballette et al. ................ 709/226 |

(Continued)

FOREIGN PATENT DOCUMENTS

CN 1878090 12/2006

OTHER PUBLICATIONS

David Chiyuan Chu, Mobile ogsi.net: Grid computing on Mobile devices, Mar. 23, 2003, University of Virginia, school of engineering.*

(Continued)

*Primary Examiner* — Kouroush Mohebbi
(74) *Attorney, Agent, or Firm* — Oblon, McClelland, Maier & Neustadt, L.L.P.

(57) ABSTRACT

Systems, apparatuses and methods are disclosed for apportioning tasks among devices. One such method is performed in handheld wireless communication device (HWCD). The method includes discovering available resources in a network and dynamically assessing cost functions for performing a task on the HWCD and on each of the discovered resources. Each of the respective cost functions is based on performance factors associated with the HWCD or with one of the devices. Based on change in the cost functions, the task is apportioned for local execution by the HWCD or remote execution by the available resources.

19 Claims, 5 Drawing Sheets

(56) References Cited

U.S. PATENT DOCUMENTS

2006/0190942 A1* 8/2006 Inoue et al. .................. 718/100
2008/0259846 A1 10/2008 Gonikberg et al.

OTHER PUBLICATIONS

Seagate Technology LLC, Seagate D.A.V.E. (Digital Audio Video Experience) Transform the consumer experience with the Seagate D.A.V.E. design concept, Data Sheet 2007.

Seagate Technology LLC, Seagate D.A.V.E. (Digital Audio Video Experience) The portable storage platform that collects, plays and manages digital content, Product Overview, 2007.

European Search Report, Nov. 23, 2012.

Selim Gurun, Chandra Krintz, Rich Wolski: "NWSLite: A lightweight prediction utility for mobile devices", Proceedings of the 2nd International Conference on Mobile Systems, Applications and Services (on-line), Jun. 2, 2004. pp. 2-11.

Ou et al: "An effective offloading middleware for pervasive services on mobile devices", Pervasive and Mobile Computing, Elsevier, NL, vol. 3, No. 4, Jun. 14, 2007, pp. 362-385.

Rajesh Krishna Balan et al.: "Tactics-Based Remote Execution for Mobile Computing", Proceedings of the 1st International Conference on Mobile Systems, Applications and Services (on-line), May 2, 2003, pp. 273-286.

Gu et al: "Adaptive Offloading Inference for Delivering Applications in Pervasive Computing Environments", Internet Citation, Mar. 23, 2003, XP002334270, Retrieved from the Internet.

Flinn J. et al: "Self-tuned remote execution for pervasive computing", Hot Topics in Operating Systems, 2001, Proeedings of the Eighth Workshop on May 20-22, 2001, IEEE, Piscataway, NJ, USA (on-line) May 20, 2001, pp. 61-66.

* cited by examiner

METHOD AND SYSTEM FOR AN ATOMIZING FUNCTION OF A MOBILE DEVICE

CROSS-REFERENCE TO RELATED APPLICATIONS

This application is a continuation of U.S. patent application Ser. No. 11/864,562, filed on Sep. 28, 2007, which claims priority to U.S. Provisional Application Ser. No. 60/951,014, filed on Jul. 20, 2007.

This application makes reference to: U.S. patent application Ser. No. 11/968,595 filed on Jan. 2, 2008; U.S. patent application Ser. No. 11/865,804 filed on Oct. 2, 2007; and U.S. patent application Ser. No. 11/865,805 filed on Oct. 2, 2007, now U.S. Pat. No. 8,233,889, issued Jul. 31, 2012.

Each of the above stated applications is hereby incorporated herein by reference in its entirety.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to handling processing of information in a communication network. More specifically, certain embodiments of the invention relate to a method and system for an atomizing function of a wireless device.

BACKGROUND

The field of wireless communication has seen dramatic growth the last few years. In today's world, most people use their wireless devices, be it cellular phones, PDA's, laptops, and/or other devices, for various purposes, business and personal, on a constant and daily basis. Society is truly becoming a wireless one. Many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA2000 may incorporate substantial data capabilities. Most of today's cellular services may include such features as text messaging, video streaming, web browsing . . . etc.

Some mobile devices have the capability to utilize one or more wireless technologies. For instance, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal may also be connected to a campus-wide WLAN network through an access point (AP) located within the building. Also, cellular technology may allow use of the mobile phone as a form of wireless modem that allows connecting a laptop, for example, to the internet via a cellular network.

Just as with other electronic devices, wireless communication devices have seen substantial growth in performance capability and speed. As such, they are finding applications in areas not predicted when first introduced to give users mobile telephony. They may comprise mini computers, multimedia players, GPS devices and many other applications, for example.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for an atomizing function of a wireless device, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION

Certain aspects of the invention may be found in a method and system for an atomizing function of a wireless device. Exemplary aspects of the invention may comprise discovering one or more available resources via a handheld wireless communication device (HWCD) in a communication network and assessing respective cost functions for processing one or more tasks by the HWCD and/or the discovered one or more available resources. The tasks may be apportioned for local execution by the HWCD and/or for remote execution by the discovered one or more available resources based on the assessed respective cost functions. The assessed respective cost functions for processing the one or more tasks by the HWCD and/or the discovered one or more available resources may be dependent on one or more factors comprising available communication bandwidth, available memory space, available CPU processing power, and available battery power, each of which may be weighted. The cost functions may be dynamically assessed, which may enable dynamic reapportioning of the one or more tasks. The one or more tasks may be apportioned based on latency, quality of service (QoS), priority and/or user preferences associated with the local execution and/or the remote execution. The HWCD and/or the discovered one or more available resources may be selected for the processing of the task based on the assessed respective cost functions, and a priority and/or a QoS associated with the task.

Figure 1:
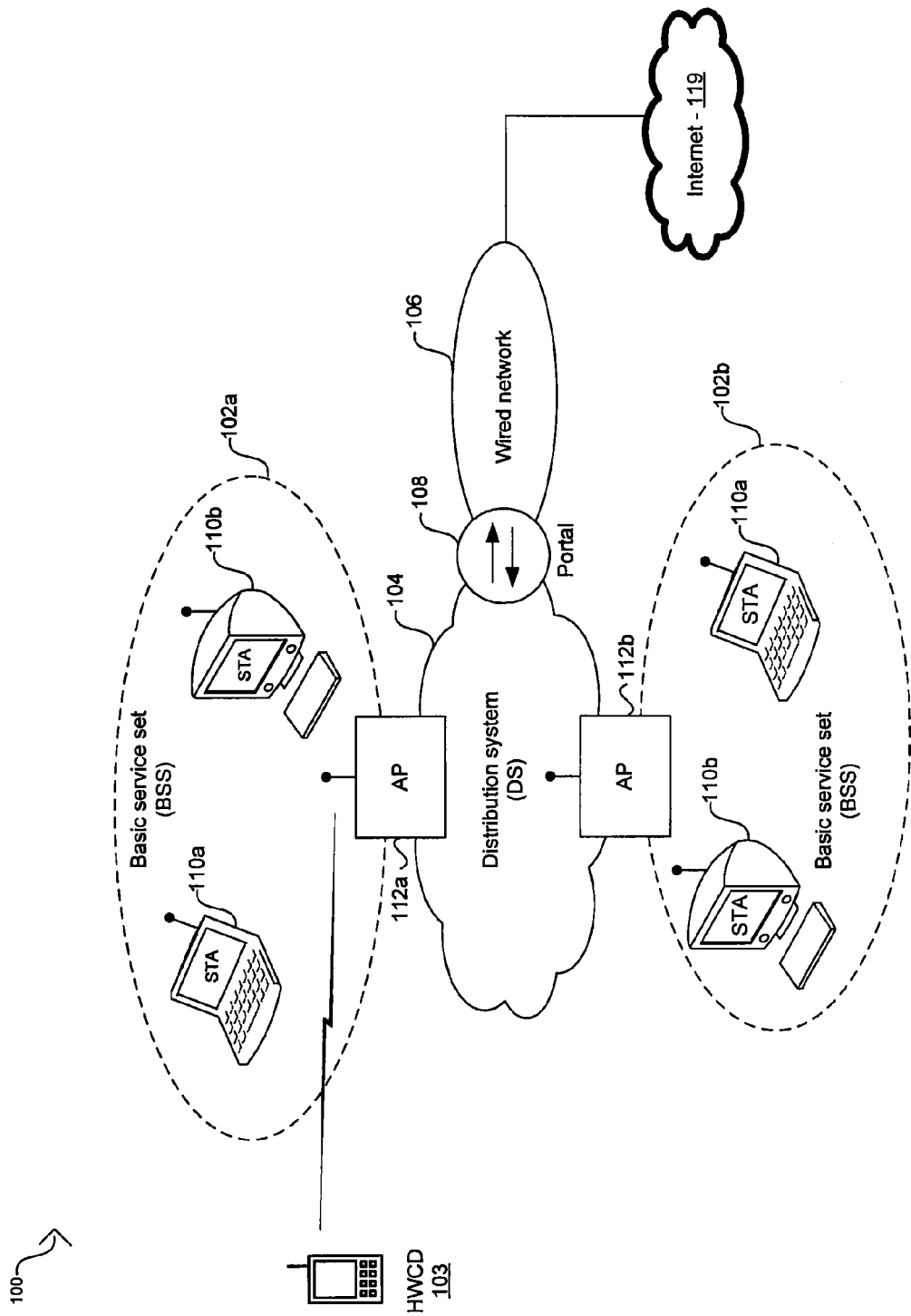
FIG. 1 is a block diagram of an exemplary WLAN infrastructure network comprising basic service sets (BSSs) integrated using a common distribution system (DS), in accordance with an embodiment of the invention.

FIG. 1 is a block diagram of an exemplary WLAN infrastructure network comprising basic service sets (BSSs) integrated using a common distribution system (DS), in accordance with an embodiment of the invention. Referring to FIG. 1, the exemplary WLAN infrastructure network 100 shown may comprise a handheld wireless communication device (HWCD) 103, a first BSS 102a, a second BSS 102b, a DS 104, a wired network 106, a portal 108, a first access point (AP) 112a, a second AP 102b, the Internet 119 and a plurality of WLAN stations 110a and 110b.

The HWCD 103 may comprise suitable circuitry, logic and/or code that may be enabled to provide wireless communication between a user and networked resources. In an exemplary embodiment of the invention, the HWCD 103 may comprise a cellular phone that may be capable of communicating utilizing multiple wireless protocols such as cellular, WLAN, WiMax, Bluetooth, RFID and NFC, for example.

The BSSs 102a and 102b may represent a fundamental building block of the IEEE 802.11 (WLAN) architecture and may be defined as a group of stations that are under the direct control of a single coordination function. The geographical area covered by a BSS is known as the basic service area (BSA). The DS 104 may be utilized to integrate the BSSs 102a and 102b and may comprise suitable hardware, logic, circuitry and/or code that may be adapted to operate as a backbone network that is responsible for Medium Access Control (MAC) level transport in the WLAN infrastructure network 100. The DS 104, as specified by the IEEE 802.11 standard, may be implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 may be logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry and/or code that may be adapted to support range extension of the WLAN infrastructure network 100 by providing the integration points necessary for network connectivity between the BSSs. The WLAN stations 110a and 110b correspond to WLAN-enabled terminals that comprise suitable hardware, logic, circuitry and/or code that may be adapted to provide connectivity to the WLAN infrastructure network 100 via the APs. The WLAN station 110a shown is a laptop computer and may correspond to a mobile station or terminal within the BSS and the WLAN station 110b shown is a desktop computer and may correspond to a fixed or stationary terminal within the BSS. Each BSS may comprise a plurality of mobile or fixed stations and may not be limited to the exemplary implementation shown in FIG. 1.

In operation, the HWCD 103 may be utilized to perform specific tasks. The tasks may require varying degrees of processing power and/or communication bandwidth, for example. Accordingly, the HWCD 103 may discover local resources and their appropriate performance factors related to the desired task. In order for the HWCD 103 to determine what tasks and/or what portions of what tasks may be atomized and communicated to other locations and/or resources for execution, many variables may be taken into account. Each variable may have its own associated weight function which may be derived from user preferences as well as application needs and requirements. Further weights may be assigned based on the capabilities of the HWCD 103 and the discovered resources.

Accordingly, a cost function may be defined as a calculated numerical value indicative of the desirability of a particular configuration in performing a desired task, wherein a high cost function may be less desirable, due to the higher cost of performing it in terms of required bandwidth, processor time and actual monetary cost, for example. A cost function may also be referred to as a cost equation, a weight factor or cost factor, for example. A number of factors may be incorporated in calculating a cost function and may comprise communication bandwidth available to the HWCD 103 and local and remote resources, the cost of communication (free WiFi versus tolled cellular access), memory available, processing power available to the HWCD 103, battery power remaining in the HWCD 103, the availability of certain applications to the HWCD 103, resource needs of the certain applications, availability of networked resources and security requirements for the specific tasks, for example. Additionally, latency requirements, Quality of Service (QoS), priority and/or user preferences regarding the aforementioned factors may be incorporated in calculating the cost functions. These factors incorporated into the cost function may be weighted such that certain factors may be considered more important than others in certain situations. For example, processing capability may be of higher importance, or weight, for a task that requires extensive processing.

The HWCD 103 may calculate the cost associated with each possible resource utilization combination, and determine the most cost effective option based on user preferences, which may be stored locally to or remotely from the HWCD 103. In instances where a task may require extensive processing but not extensive communication bandwidth, the task may be communicated to a networked resource, such as the WLAN station 110b, for example, for processing. In instances where a task may require limited processing power and communication bandwidth may be scarce and/or expensive, the task may be performed locally on the HWCD 103. The factors used to determine the cost function may vary depending on the task.

In another embodiment of the invention, a task may be atomized, or partitioned into multiple smaller tasks, which may be apportioned to and executed by one or more resources including the HWCD 103, either in parallel or sequentially, for example.

Figure 2:
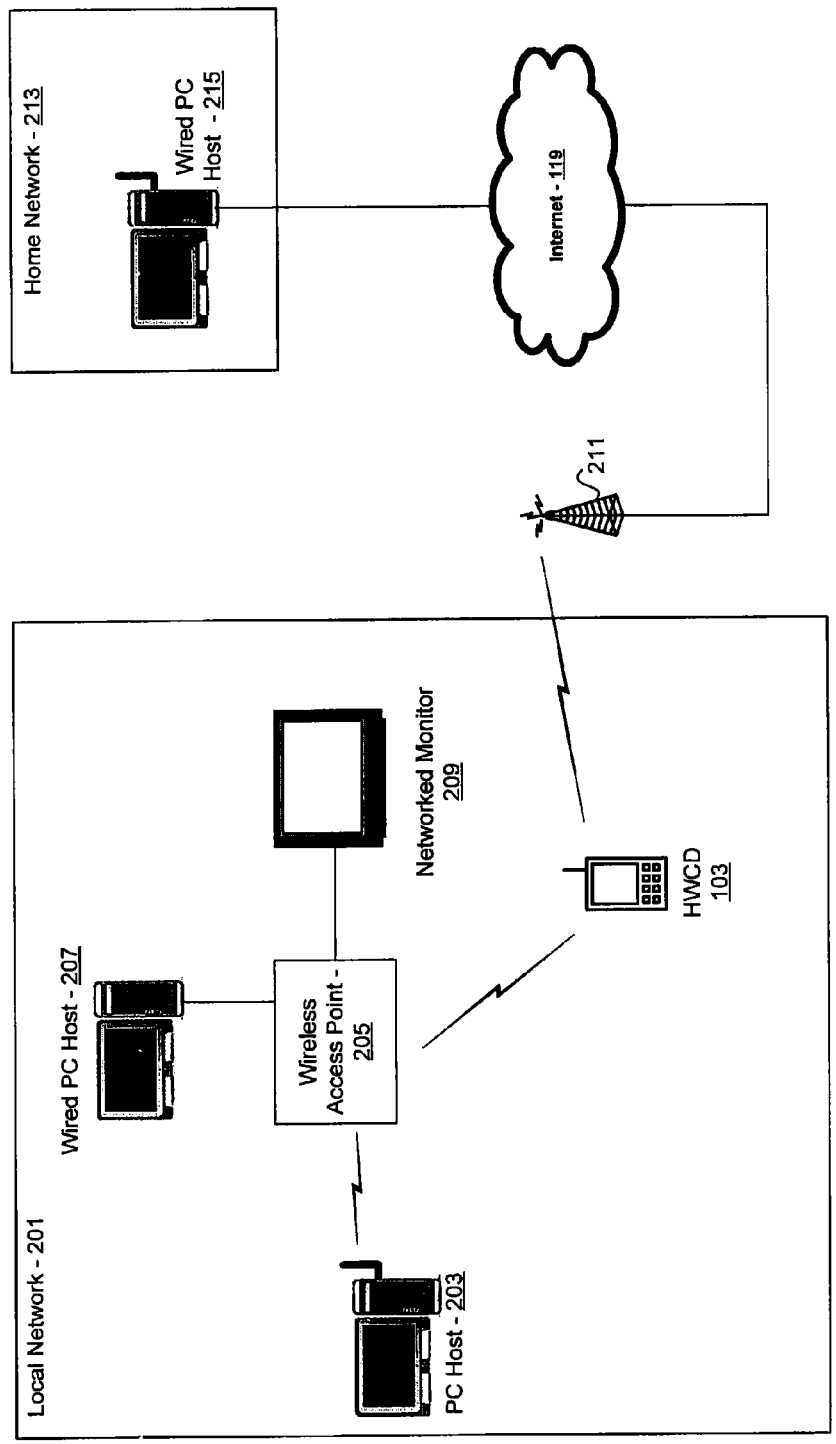
FIG. 2 is a block diagram illustrating exemplary resource utilization in accordance with an embodiment of the invention.

FIG. 2 is a block diagram illustrating exemplary resource utilization in accordance with an embodiment of the invention. Referring to FIG. 2, there is shown a local network 201, a cellular tower 211, the Internet 119 and a home network 213. The local network 201 may comprise the HWCD 103, a PC host 203, a wireless access point 205, a wired PC host 207 and a networked monitor 209. The PC host 203 and the wired PC host 207 may comprise computing systems, for example, that may be enabled to perform specific tasks as requested by the HWCD 103. The wired PC host 207 may be communicatively coupled to the wireless access point 205, which may enable wireless communication of resources within the local network 201. The home network 213 may comprise a wired PC host 215 which may be communicatively coupled to the Internet 119.

In operation, the HWCD 103 may be utilized to perform specific tasks. The tasks may be performed in conjunction with one or more networked resources, including the PC host 203, the wired PC host 207, the networked monitor 209, and/or the wired PC host 215, for example. A cost function, as described with respect to FIG. 1 may be calculated for each of the possible resource utilization configurations. The HWCD 103 may enable the utilization configuration with the lowest cost function of all the calculated options.

In an exemplary embodiment, in instances where the specific task to be performed requires extensive processing power, the task may be communicated to one or more resources, such as the PC host 203, the wired PC host 207, and/or the wired PC host 215. In instances where the communication bandwidth of the local network 201 may be limited and/or restricted, the HWCD 103 may communicate the specific task to the wired PC host 215 via the cellular tower 211 and the Internet 119. If the security of the local network 201 may be questionable as compared to the cellular network capability provided by the cellular tower 211, the calculated cost function may be high for the local network 201 utilization configurations as compared to utilizing the wired PC host 215 in the home network 213.

In instances where the specific task may require significant processing power as well as communication bandwidth, such as with the rendering of a large video file, for example, and the communication bandwidth of the local network 201 may be significantly higher than the cellular service provided by the cellular tower 211, the cost function of the local network 201 configurations may be lower compared to utilizing the wired PC host 215 in the home network 213. In an exemplary embodiment, the HWCD 103 may query of the resources in a network whether they can transcode or convert multimedia content and the cost of such a task, with this information incorporated into the calculation of the cost function. In this instance, the HWCD 103 may communicate the task to one or more of the PC host 203 and the wired PC host 207. Additionally, if the user of the HWCD 103 has a preference of a large screen for the display of video data, the HWCD 103 may communicate the rendered video to the networked monitor 209.

In another embodiment of the invention, if firmware, software and/or code which may be utilized to perform a specific task may not be available to a resource in the local network 201, and the task requires extensive processing power, the task may be communicated to a resource where the firmware, software and/or code may be available, such as on the wired PC host 215.

Figure 3:
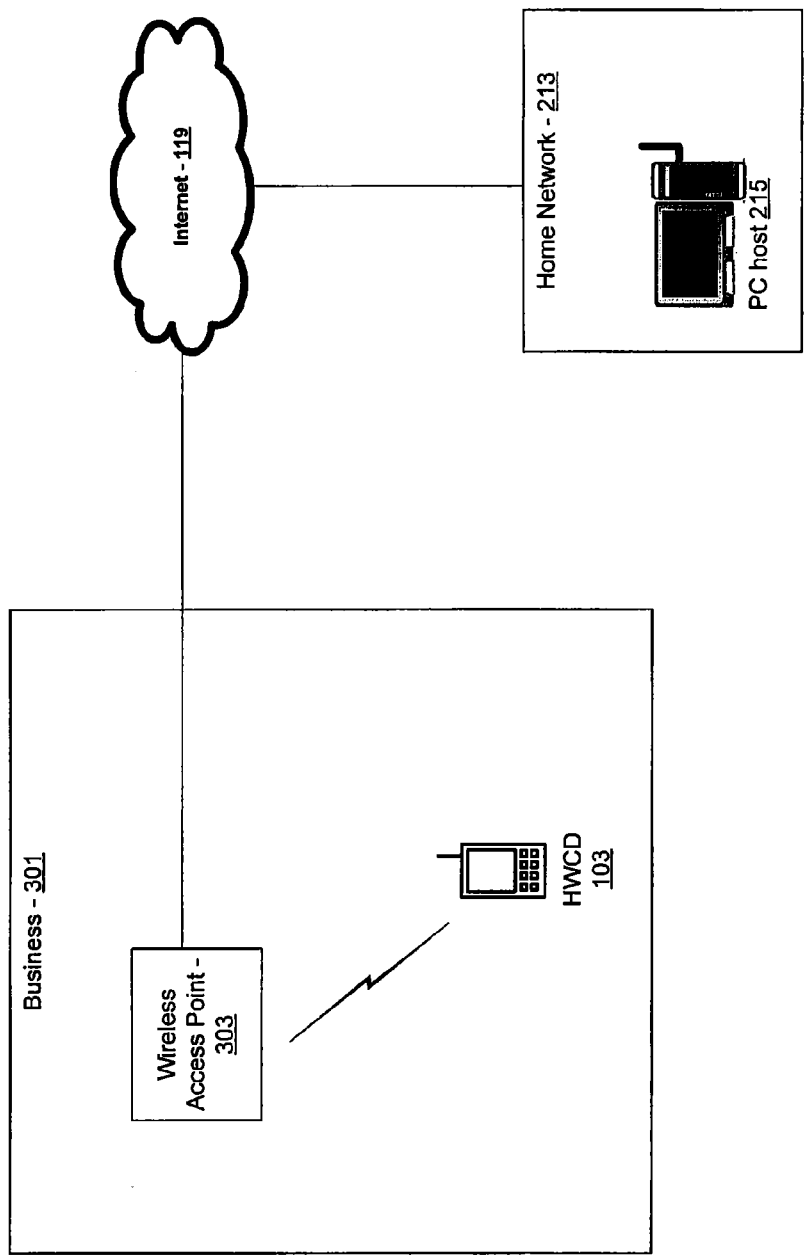
FIG. 3 is a block diagram illustrating an exemplary embodiment comprising limited local resources, in accordance with an embodiment of the invention.

FIG. 3 is a block diagram illustrating an exemplary embodiment comprising limited local resources, in accordance with an embodiment of the invention. Referring to FIG. 3, there is shown a business 301, the Internet 119 and the home network 213. The business may comprise a location, such as a coffee house, for example, where there may be no local resources that may be utilized but low cost wireless services. The wireless access point 303 may be enabled to provide the wireless communication between wireless devices such as the HWCD 103, for example, and the Internet 119.

In operation, the HWCD 103 may be utilized to perform a task. The cost function as described with respect to FIG. 1 may be calculated for the possible configurations. In this case, as there are no local processing resources, if the task requires significant processing that may be too intensive for the HWCD 103 to perform, the task may be communicated to the PC host 215 in the home network 213 via the Internet 119 and the wireless access point 303. In another embodiment of the invention, the task may be atomized into sub-tasks and the cost function may be calculated for each configuration possible for the completion of the task. The sub-tasks may then be apportioned to the one or more resources that result in the best, or lowest, cost function. For example, numerous smaller sub-tasks may be performed locally on the HWCD 103 and larger, processing-intensive sub-tasks may be performed by the PC host 215.

Figure 4:
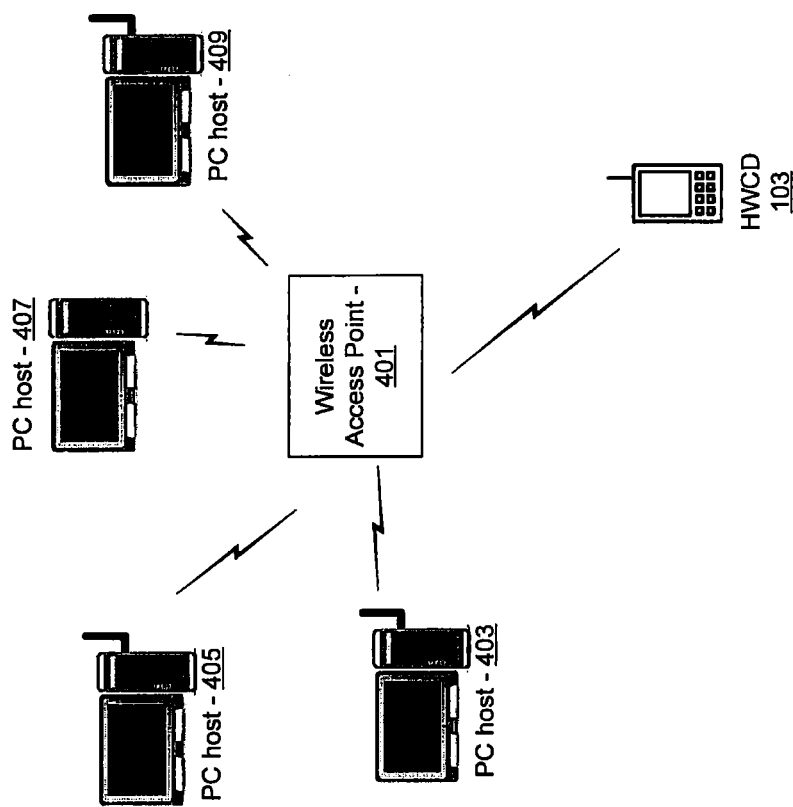
FIG. 4 is a block diagram of a parallel resource utilization configuration, in accordance with an embodiment of the invention.

FIG. 4 is a block diagram of a parallel resource utilization configuration, in accordance with an embodiment of the invention. Referring to FIG. 4, there is shown the HWCD 103, a wireless access point 401 and a plurality of PC hosts 403, 405, 407 and 409. The wireless access point 401 may comprise suitable circuitry, logic and/or code that may enable wireless communication between the HWCD 103 and the PC hosts 403, 405, 407 and 409.

In operation, the HWCD 103 may be utilized to perform a task. The cost function as described with respect to FIG. 1 may be calculated for the possible configurations, with processing performed locally on the HWCD 103, via one or more of the PC hosts 403, 405, 407 and 409, or a combination of the two. In instances where the speed of execution of the task may be of most importance, the task may be atomized, or partitioned into multiple sub-tasks. These sub-tasks may be communicated to the PC hosts 403, 405, 407 and 409 that may be enabled to perform the sub-tasks in parallel, thus increasing the speed of execution of the task.

In an embodiment of the invention, the cost functions of the plurality of possible configurations may be dynamic as needed, and may be recalculated and re-atomized as the various factors may adjust, such as through changes in communication bandwidth or available processing power of resources.

Figure 5:
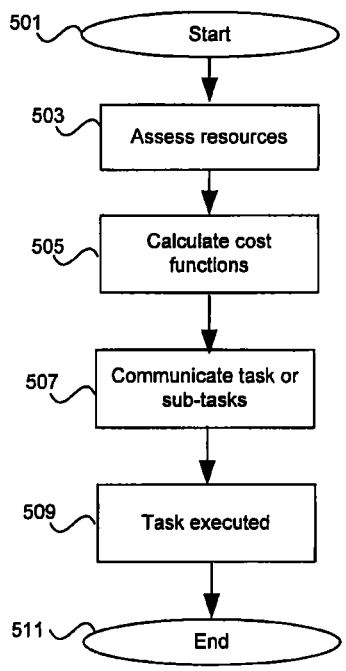
FIG. 5 is a flow diagram of an exemplary cost function and task execution process, in accordance with an embodiment of the invention.

FIG. 5 is a flow diagram of an exemplary cost function and task execution process, in accordance with an embodiment of the invention. Following start step 501, in step 503, resources available to the HWCD 103 for performing one or more tasks may be assessed. In step 505, cost functions for each possible configuration may be calculated. In step 507, the task or sub-tasks may be communicated to the one or more resources calculated to have the best cost function for completing the task, followed by step 509 where the task or sub-tasks are executed, and end step 511.

In an embodiment of the invention, a method, system and machine-readable code are disclosed for discovering one or more available resources via a handheld wireless communication device (HWCD) 103 in a communication network and assessing respective cost functions for processing one or more tasks by the HWCD 103 and/or the discovered one or more available resources 203, 207, 209, 403, 405, 407 and 409. The tasks may be apportioned for local execution by the HWCD 103 and/or for remote execution by the discovered one or more available resources 203, 207, 209, 403, 405, 407 and 409 based on the assessed respective cost functions. The assessed respective cost functions for processing the one or more tasks by the HWCD 103 and/or the discovered one or more available resources 203, 207, 209, 403, 405, 407 and 409 may be dependent on one or more factors comprising available communication bandwidth, available memory space, available CPU processing power, and available battery power, each of which may be weighted. The cost functions may be dynamically assessed, which may enable dynamic reapportioning of the one or more tasks. The one or more tasks may be apportioned based on latency, quality of service (QoS), priority and/or user preferences associated with the local execution and/or the remote execution. The HWCD 103 and/or the discovered one or more available resources 203, 207, 209, 403, 405, 407 and 409 may be selected for the processing of the task based on the assessed respective cost functions, and a priority and/or a QoS associated with the task.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method of utilizing a handheld wireless communication device, the method comprising:
   discovering one or more available resources in a communication network;
   dynamically assessing respective cost functions for performing a task on the handheld wireless communication device and on each of the discovered one or more available resources, each of the respective cost functions is based on one or more performance factors associated with one of the discovered one or more available resources or with the handheld wireless communication device;
   detecting a change in the dynamically assessed respective cost functions; and
   apportioning, based on the detected change in the dynamically assessed respective cost functions, the task for one or both of a local execution by the handheld wireless communication device and a remote execution by the discovered one or more available resources,
   wherein at least one of the dynamically assessed respective cost functions is based on a user preference, the user preference indicating the performance of the task on at least one of the handheld wireless communication device or the discovered one or more available resources.

2. The method according to claim 1, wherein the dynamically assessed respective cost functions are dependent on one or more factors comprising available communication bandwidth, available memory space, available CPU processing power, and available battery power.

3. The method according to claim 2, wherein the one or more factors are each weighted by a weighting factor.

4. The method according to claim 3, wherein at least one of the weighting factors is based at least in part on a user preference.

5. The method according to claim 1, wherein the apportioning of the task for one or both of the local execution and the remote execution is based on a Quality of Service (QoS) associated with the local execution or the remote execution.

6. The method according to claim 1, wherein the apportioning of the task for one or both of the local execution and the remote execution is based on a priority associated with the local execution or the remote execution.

7. The method according to claim 1, wherein the apportioning of the task for one or both of the local execution and the remote execution is based on a latency associated with the local execution or the remote execution.

8. The method according to claim 1, wherein the dynamically assessed respective cost functions are dependent on security requirements for the task.

9. A non-transitory computer-readable medium having a computer program recorded thereon, the computer program configured to perform a method when executed on a computer, the method comprising:
 discovering one or more available resources in a communication network;
 assessing a local cost function for performing a task on a handheld wireless communication device, the local cost function is based on one or more performance factors associated with the handheld wireless communication device;
 assessing remote cost functions for performing the task on each of the discovered one or more available resources, each of the remote cost functions is based on one or more performance factors associated with one of the discovered one or more available resources; and
 apportioning, based on a change in the assessed local and remote cost functions, the tasks for one or both of a local execution by the handheld wireless communication device and a remote execution by the discovered one or more available resources,
 wherein at least one of the assessed local and remote cost functions is based on a user preference, the user preference indicating the performance of the task on at least one of the handheld wireless communication device or the discovered one or more available resources.

10. The non-transitory computer-readable medium according to claim 9, further comprising:
 re-assessing the remote cost functions for performing the task; and
 determining the change in the assessed local and remote cost functions using the re-assessed remote cost functions.

11. The non-transitory computer-readable medium according to claim 9, wherein the remote cost functions for performing the task are dependent on one or more factors comprising available communication bandwidth, available memory space, available CPU processing power, and available battery power.

12. The non-transitory computer-readable medium according to claim 9, wherein
 the apportioning of the task for one or both of the local execution and the remote execution is based on a Quality of Service (QoS) associated with the local execution or the remote execution.

13. The non-transitory computer-readable medium according to claim 9, wherein
 the apportioning of the task for one or both of the local execution and the remote execution is based on a priority associated with the local execution or the remote execution.

14. The non-transitory computer-readable medium according to claim 9, wherein
 the apportioning of the task for one or both of the local execution and the remote execution is based on a latency associated with the local execution or the remote execution.

15. A system comprising:
 a handheld wireless communication device (HWCD) comprising one or more processors, the one or more processors being configured to:
  discover one or more available resources in a communication network;
  perform an initial assessment of respective cost functions for executing a task on the handheld wireless communication device and on each of the discovered one or more available resources, each of the respective cost functions is associated with the task and is based on one or more performance factors associated with one of the discovered one or more available resources or with the handheld wireless communication device;
  apportion, based on the initially assessed respective cost functions, the task for one or both of a local execution by the handheld wireless communication device and a remote execution by the discovered one or more available resources; and
  re-apportion, based on a change to the respective cost functions, the task for one or both of the local execution by the handheld wireless communication device and the remote execution by the discovered one or more available resources,
 wherein at least one of the initially assessed respective cost functions is based on a user preference, the user preference indicating the performance of the task on at least one of the handheld wireless communication device or the discovered one or more available resources.

16. The system according to claim 15, wherein the initially assessed respective cost functions for executing the task are dependent on one or more factors comprising available communication bandwidth, available memory space, available CPU processing power, and available battery power.

17. The system according to claim 15, wherein the one or more processors is configured to apportion the task for one or both of the local execution and the remote execution based on a quality of service (QoS) associated with the task.

18. The system according to claim 15, wherein the one or more processors is configured to apportion the task for one or both of the local execution and the remote execution based on a priority associated with the task.

19. The system according to claim 15, wherein the one or more processors is configured to apportion the task for one or both of the local execution and the remote execution based on a latency associated with the task.

* * * * *